United States Patent [19]

Shoji et al.

[11] Patent Number: 4,635,771

[45] Date of Patent: Jan. 13, 1987

[54] ONE-WAY CLUTCH BEARING

[75] Inventors: Masao Shoji, Fujisawa; Mikio Uchida, Yamato; Noboru Kitamura, Fujisawa, all of Japan

[73] Assignee: NSK-Warner K. K., Tokyo, Japan

[21] Appl. No.: 689,949

[22] Filed: Jan. 9, 1985

[30] Foreign Application Priority Data

Jan. 21, 1984 [JP] Japan ................................. 59-9091

[51] Int. Cl.$^4$ ............................................. F16D 15/00
[52] U.S. Cl. .............................. 192/41 A; 192/56 R; 192/45.1
[58] Field of Search .................... 192/56 R, 41 A, 45, 192/45.1; 188/82.8

[56] References Cited

U.S. PATENT DOCUMENTS

| | | | |
|---|---|---|---|
| 2,824,636 | 2/1958 | Troendly et al. | 192/45.1 |
| 3,019,873 | 2/1962 | Ferris et al. | 192/45.1 |
| 3,204,430 | 9/1965 | Smirl. | |
| 3,819,019 | 6/1974 | Timtner | 192/41 A |
| 3,978,949 | 9/1976 | Timtner | 192/41 |
| 3,978,950 | 9/1976 | Timtner | 192/41 |

Primary Examiner—Rodney H. Bonck
Assistant Examiner—Alan G. Towner
Attorney, Agent, or Firm—Shapiro and Shapiro

[57] ABSTRACT

In a one-way clutch bearing having an outer race having an annular inner surface, an inner race having an annular outer surface corresponding to and concentric with the inner surface, and rolling members disposed in an annular space formed between the inner surface and the outer surface, whereby relative rotation of the inner and outer races in one direction is prevented by displacement of the rolling members in the space and a torque is transmitted, holding means for holding the rolling members is provided at a displacement position whereat the rolling members transmit a predetermined transmission torque, and means is provided for decreasing a wedge angle (an angle defined by a line extending from the center of the inner race to the point of contact between the rolling member and the inner race and a line passing through the points of contact between the rolling member and the inner and outer races) at a position before the rolling members arrive at the displacement position.

4 Claims, 9 Drawing Figures

ONE-WAY CLUTCH BEARING

BACKGROUND OF THE INVENTION

1. Field of the Invention

This invention relates to improvements in a one-way clutch bearing.

2. Description of the Prior Art

Two types of one-way clutch bearing, i.e., the sprag type and the roller type, are known.

The sprag type one-way clutch bearing is comprised of an outer race having an annular inner surface, an inner race having an outer surface corresponding to and concentric with the inner surface, and a plurality of sprags disposed in an annular space formed between the inner and outer surfaces. When the inner race rotates in one direction, the upper and lower cam surfaces of the sprags become inclined to a position in which they do not transmit a torque, and permit relative rotation of the inner race and the outer race. On the other hand, when the inner race is about to rotate in the other direction, the cam surfaces of the sprags move and the sprags are inverted to prevent relative rotation of the inner and outer races, whereby a torque is transmitted from the inner race to the outer race.

On the other hand, the roller type one-way clutch bearing has a construction in which rollers are contained in roller containing grooves formed in one of an inner race and an outer race and are biased by springs in such a direction that the clearance between the bottom surface and the circumferential surface of the grooves becomes narrow. When one of the inner race and the outer race is driven in a certain direction, it rotates idly, and when one of the inner race and the outer race is driven in the other direction, the rollers roll in the roller containing grooves and bite between the bottom surface and the circumferential surface of the grooves to prevent relative rotation of the inner race and the outer race, whereby a torque is transmitted.

The above-described conventional one-way clutch bearings maintain a long life as long as they are used under a load torque of a predetermined value or less, but if an accidental excessive torque is imparted thereto, the sprags or the rollers may go beyond a predetermined torque transmitting position and further push into the inner and outer races, thereby leaving impressions on the surface of the sprags or the rollers which is in contact with the inner and outer races, or breaking the sprags or the rollers. Also, in such a case, the rollers may jump out toward the non-torque-transmitting side, i.e., the side of the springs which bias the rollers, thereby damaging the springs.

To eliminate such inconveniences, one might provide, in the case of the sprag type, a planar portion at a location beyond the cam surface which transmits a predetermined torque, and in the case of the roller type, to hold the rollers at an allowed maximum torque transmitting position by holding means, thereby causing the sprags or the rollers to slide when an excessive torque is imparted. However, when an excessive torque is imparted to a one-way clutch bearing actually using the above-described sprags or rollers, the slight movement of the posture of the sprags or rollers when they have begun to slide appears in the form of a variation in transmission torque and the sprags or rollers jump and cannot slide stably.

SUMMARY OF THE INVENTION

It is an object of the present invention to provide a one-way clutch bearing which permits the sprags or rollers to slide stably when an excessive torque is imparted and which has a long life.

The present invention achieves the above object by a one-way clutch bearing having an outer race having an annular inner surface, an inner race having an annular outer surface corresponding to and concentric with said inner surface, and rolling members disposed in an annular space formed between said inner surface and said outer surface, whereby relative rotation of said inner and outer races in one direction is prevented by displacement of said rolling members in said space and a torque is transmitted, characterized in that holding means for holding said rolling member is provided at a displacement position whereat said rolling members transmit a predetermined transmission torque, and in that a section in which a wedge angle (an angle defined by a line extending from the center of said inner race to the point of contact between said rolling member and said inner race and a line passing through the points of contact between said rolling member and said inner and outer races) decreases is provided at a location before said rolling members arrive at said displacement position.

DESCRIPTION OF THE PREFERRED EMBODIMENTS

Some embodiments of the present invention will hereinafter be described by reference to the drawings.

Figure 1:
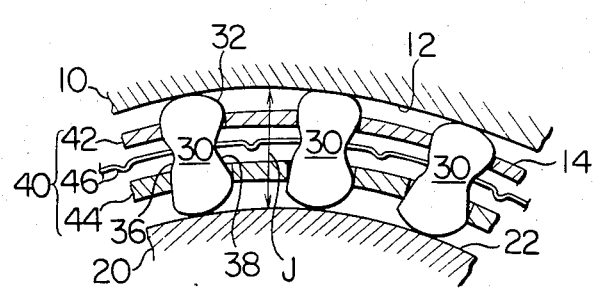
FIG. 1 is a cross-sectional front view showing an embodiment of the sprag type one-way clutch bearing according to the present invention.
Figure 2:
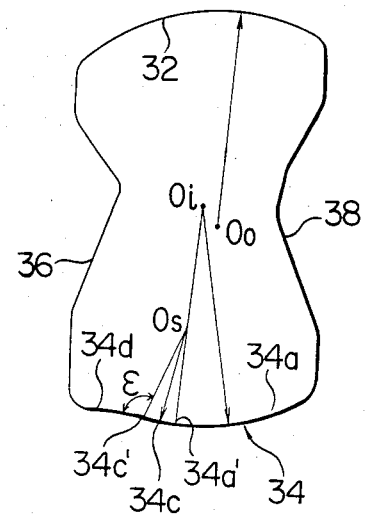
FIG. 2 is an enlarged front view of the sprag of FIG. 1.

FIGS. 1 and 2 show an embodiment of the spray type one-way clutch bearing according to the present invention. This one-way clutch bearing is comprised of an annular outer race 10, an annular inner race 20 disposed inside the outer race 10 concentrically therewith, a number of sprays 30 disposed between the outer race and the inner race, and holding means 40 for holding the sprags 30.

The annular outer race 10 has an annular inner surface 12. On the other hand, the annular inner race 20 has an annular outer surface 22 opposed to the inner surface 12 of the outer race 10. In the present embodiment, the inner race 20 is a torque-transmitting member engaged with a drive shaft, not shown, and rotatable with the drive shaft to transmit a torque, and the outer race 10 is a driven member to which the torque is transmitted by the rotation of the inner race 20 only in one direction (the clockwise direction as viewed in FIG. 1). It is also possible to use the outer race 10 as a torque-transmitting member and the inner race 20 as a driven member conversely to the present embodiment.

A number of sprags 30 are arranged circumferentially in an annular space 14 formed between the inner surface 12 of the outer race 10 and the outer surface 22 of the inner race 20. Each sprag 30 is gourd-shaped and side surfaces 36 and 38 thereof connected to cam surfaces 32 and 34 which bear against the inner surface 12 and the outer surface 22, respectively, have recesses in the central portions thereof and are held by holding means 40 which will later be described.

The cam surface 32, as shown in FIG. 2, is formed by a curved surface centered at $O_o$ and having a single predetermined curvature. On the other hand, the cam surface 34 is formed by a curved surface 34a centered at a center $O_i$ different from the center $O_o$ and having a predetermined curvature, a surface 34c continuous to the curved surface 34a, and a flat surface 34d continuous to the surface 34c. The center $O_o$ is eccentric in the direction of rotation of the outer race 10 (right as viewed in FIG. 2) and the center $O_i$ is eccentric in the opposite direction (left as viewed in FIG. 2). The centers $O_o$ and $O_i$ and the curvatures of the cam surfaces 32 and 34a are determined by the relation between the magnitude of the transmitted torque and the distance J of the space 14 between the inner race 20 and the outer race 10, and this is a well-known technique.

The point of inflection 34a' on the cam surface 34 from the curved surface 34a to the surface 34c is determined by the maximum transmitted torque.

A method of setting this point of inflection 34a' to the flat surface 34d will hereinafter be described by reference to FIGS. 2 to 5.

Figure 3:
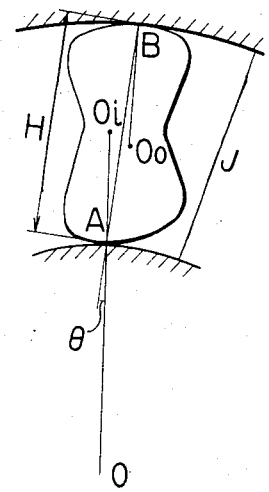
FIG. 3 is a fragmentary front view of the sprag of FIG. 1 for showing the sprag height and wedge angle.

In FIG. 3, the distance between the point of contact A between the inner race 20 and the sprag 30 and the point of contact B between the outer race 10 and the sprag 30 is the spray height H. On the other hand, the angle defined by a line passing through the point of contact A and extending outwardly from the center of rotation O of the inner race 20 and the outer race 10 and a line passing through the points of contact A and B is a wedge angle $\theta$.

Figure 4:
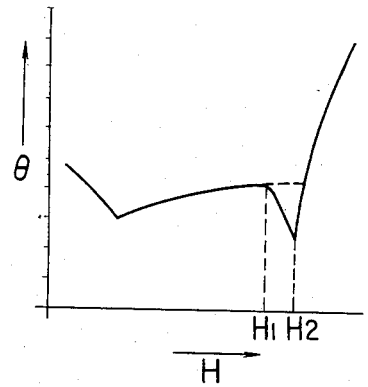
FIG. 4 is a graph showing the relation between the sprag height and the wedge angle when the sprag shown in FIG. 2 is used.

In the case of the sprag shape shown in FIG. 2, the relation between the sprag height H and the wedge angle $\theta$ is such that as shown in FIG. 4, as the sprag 30 rotates from the non-torque-transmitting portion of the cam surface 34 (i.e., the right end of the curved surface 34a) toward the torque-transmitting portion (i.e., in the counter-clockwise direction), the wedge angle $\theta$ decreases once and thereafter gradually increases and decreases over the section from the sprag height $H_1$ to the sprag height $H_2$ and again sharply increases from a point beyond the sprag height $H_2$. That is, the surface 34c is provided so that when a point on the cam surface 34 which provides the sprag height $H_1$ transmitting the maximum torque is 34a' and this point 34a' is the point of inflection, the wedge angle $\theta$ decreases over the section to the sprag height $H_2$. In the present embodiment, this surface 34c is formed by a curved surface having a curvature smaller than that of the curved surface 34a, but it may be a curved surface having a curvature greater than that of the curved surface 34a if it is of such a shape that the wedge angle $\theta$ decreases. In FIG. 4, the relation between the sprag height and the wedge angle when the surface 34c is not provided is indicated by a broken curve.

A point 34c' at which the surface 34c terminates corresponds to the point which provides the sprag height $H_2$, and the flat surface 34d begins from this point 34c'. The flat surface 34d is formed so that the angle $\epsilon$ forming the line passing through a center $O_s$ and the point 34c' intersects at an angle greater than 90° (preferably 97°).

The holding means 40 for the sprags 30 is disposed in the annular space 14 between the outer race 10 and the inner race 20, as shown in FIG. 1. The holding means 40 is comprised of an annular first holding member 42 disposed inside the outer race 10, and annular second holding member 44 disposed adjacent to the inner race 20, and an annular biasing spring 46 disposed between the first and second holding members. Rectangular holes are formed at equal intervals in the peripheries of the first holding member 42, the second holding member 44 and the biasing spring 46, respectively, so that sprags 30 are held in these holes. The biasing spring 46 biases the vicinity of the bottoms of the recesses provided in the side surfaces 36 and 38 of each sprag 30 so as to provide a moment in the torque-transmitting direction (the counter-clockwise direction as viewed in FIG. 1) during the stoppage and the idle rotation of the inner race 20.

In the present embodiment, the holding means 40 is comprised of the first holding member 42 and the second holding member 44, but in another embodiment the holding means may be comprised of one of the first and second holding members 42 and 44, or a single holding member may be provided adjacent to the recesses of the side surfaces 36 and 38 of the sprags 30.

Operation of the sprag type one-way clutch bearing having the above-described construction will now be described.

Figure 5:
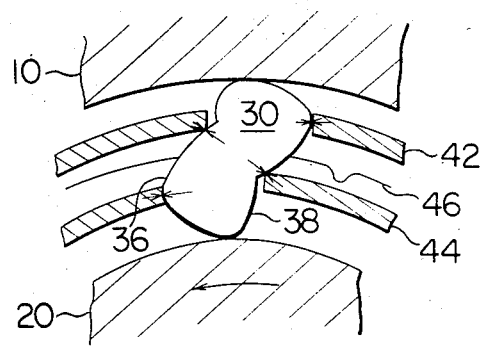
FIG. 5 is a cross-sectional front view showing the relative position of the sprag and holding means of the one-way clutch bearing during idle rotation of the inner race.

Each constituent part is in the position of FIG. 1 when the inner race 20 is stopped. In FIG. 1, when the inner race 20 rotates in the counter-clockwise direction, the sprags 30 turn clockwise, whereafter as shown in FIG. 5, the side surfaces 36 and 38 of the sprags 30 bear against the first holding member 42 and the second holding member 44 and are held in that position. The sprag height H in this position is set so as to be smaller than the height J (see FIG. 3) of the annular space between the inner race 20 and the outer race 20 and thus, the inner race 20 rotates relative to the outer race 10, that is, rotates idly.

On the other hand, when the inner race 20 rotates clockwise, the sprags 30 turn counter-clockwise and the sprag height H of the cam surface 34a increases so that the sprags 30 mesh with the inner race 20 and the outer race 10. In this state, the outer race 10 rotates with the inner race 20 and thus, a torque is transmitted from the inner race 20 to the outer race 10.

Figure 6:
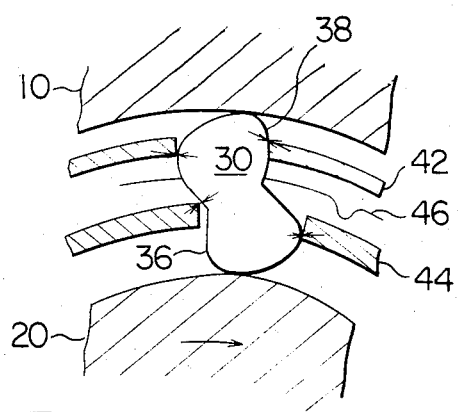
FIG. 6 is a cross-sectional front view of the one-way clutch bearing when the sprag is in its sliding state.

However, when the inner race 20 is about to be rotated clockwise by a torque of a predetermined value or more, the sprags 30 further turn counter-clockwise from the normal torque transmitting position and the cam surface 34 goes beyond a point 34a' which provides the sprag height $H_1$ of the curved surface 34a, and the surface 34c and finally two points on the flat surface 34d or the flat surface 34d and the curved surface 34a or the surface 34c come to bear against the outer surface 22 of the inner race 20. At this time, the first holding member 42 and the second holding member 44 hold the side surfaces 36 and 38 of the sprags 30 as shown in FIG. 6 and therefore, the sprags 30 are stably held in this position. In this position (the displaced position), the sprags 30 may stably transmit a predetermined transmission torque for the rotation of the inner race 20 and may slide for a torque of a predetermined value or more.

In the above-described embodiment, the flat portion is set to the cam surface of each sprag which bears against the inner race, but alternatively, this flat portion may be set to the cam surface of each sprag which bears against the outer race, or may be set to both of these cam surfaces.

An embodiment in which the present invention is applied to a roller type one-way clutch bearing will now be described by reference to FIG. 7.

Figure 7:
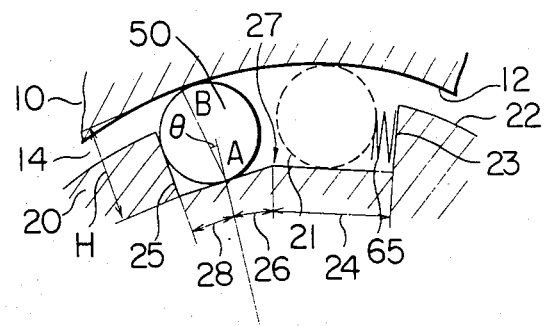
FIG. 7 is a cross-sectional front view showing an embodiment in which the present invention is applied to a roller type one-way clutch bearing.

The one-way clutch bearing shown in FIG. 7 is comprised of an annular outer race 10, an annular inner race 20 disposed inside the outer race 10 concentrically therewith, rollers 50 disposed in grooves 21 formed in the outer periphery of the inner race 20, and a spring 65 for biasing each roller 50 in a meshing direction.

The annular outer race 10 has an annular inner surface 12. On the other hand, the annular inner race 20 has an annular outer surface 22 opposed to the inner surface 12 of the outer race 10, and a plurality of grooves 21 are formed in the periphery of the outer surface 22 and a roller 50 is contained in each of the grooves 21. Each groove 21 comprises a front wall 23, a rear wall 25, bottom surfaces 24, 26 and 28 and side walls, not shown.

The shape of each groove 21 is such that the relation between the distance H between the points of contact A and B between the outer race 10, the inner race 20 and each roller 50 and a wedge angle $\theta$ formed by a line passing through these points of contact A and B and a line passing through the center O of the outer race 10 and the inner race 20 provides the relation of FIG. 4. The shape of the groove 21 to the point $H_1$ in FIG. 4 is heretofore known, but in the present invention, each roller 50 is adapted to transmit a predetermined maximum torque at the distance $H_1$ between the points of contact A and B, and this distance $H_1$ is provided when the roller 50 passes the point of inflection 27 on the bottom surfaces 24 and 26. The bottom surfaces 24 and 26 are formed by curved or flat surfaces which provide the curves to the distance $H_1$ of FIG. 4 and from $H_1$ to $H_2$. The rear wall 25 is provided at a position whereat the distance between the points of contact A and B between the roller 50 and the inner and outer races is $H_2$. The bottom surface 28 of the groove is an extension from the bottom surface 26 to the rear wall 25.

A spring 65 for biasing each roller 50 in a direction to mesh with the inner and outer races (the leftward direction as viewed in FIG. 7) is disposed between the front wall 23 and the roller 50.

In the roller type one-way clutch bearing of the above-described construction, when the inner race 20 rotates counter-clockwise as viewed in FIG. 7, the roller 50 rolls toward the front wall 23 and therefore, no torque is transmitted. On the other hand, when the inner race 20 rotates clockwise as viewed in FIG. 7, the roller 50 rolls in a predetermined direction and is engaged between the inner and outer races, so that a torque is transmitted. When the inner race 20 is about to be driven by a greater torque, the roller 20 goes beyond the point of inflection 27 on the bottom surface at which the distance between the points of contact A and B between the roller and the inner and outer races is $H_1$, and enters the area of the bottom surface 26. The roller 50 moves on the bottom surface 26 and at last arrives at the rear wall 25, and begins to slide at this point.

In the above-described embodiment, the grooves 21 for containing the rollers 50 therein are formed in the inner race 20, but alternatively, these grooves 21 may be formed in the outer race 10. Further, the driving race may be the outer race 10 instead of the inner race 20. Also, if use is made of a holder for holding the roller 50 when the roller 50 has arrived at the rear wall 25, the roller 50 will slide more stably.

Figure 8:
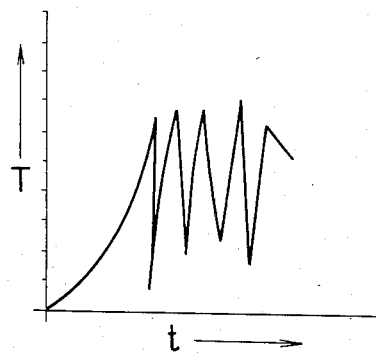
FIG. 8 is a graph showing the result of the torsion test of a one-way clutch bearing having the relation of the broken line indicated in FIG. 4.
Figure 9:
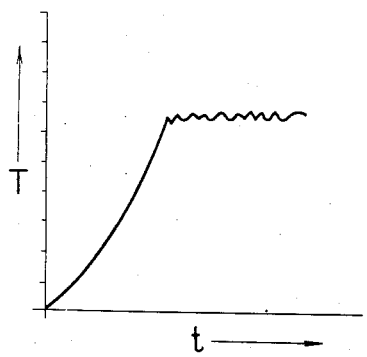
FIG. 9 is a graph showing the result of the torsion test of the one-way clutch bearing according to the present invention.

According to the present invention, as described above, there is provided a one-way clutch bearing of such a structure that the sprags or the rollers can slide stably when they are subjected to an excessive torque of a predetermined value or more. In the present invention, as shown in FIG. 4, the relation between the wedge angle and the sprag height or the distance between the points of contact between each roller and the inner and outer race is rendered such as indicated by a solid line (so that the wedge angle is decreased by providing the surface 34c or the bottom surface 26) rather than such as indicated by a broken line (in the case of the sprags type, the surface 34c of FIG. 2 is not provided so that the surface changes from the curved surface 34a to the flat surface 34d, and in the case of the roller type, the point of inflection 27 of FIG. 7 is not provided but the bottom surface 24 is extended), whereby the sprags or the rollers can slide in a stable posture. The results obtained when a one-way clutch bearing having the relation indicated by the broken line of FIG. 4 and the one-way clutch bearing of the present invention (having the relation indicated by the solid line of FIG. 4) were actually subjected to a torsion test (a test for imparting an excessive torque to the drive shaft and examining the time variation in the torque transmitted to the driven race side) are shown in FIGS. 8 and 9, respectively. It can be seen that in the one-way clutch bearing of FIG. 8, the sprags or the rollers do not slide smoothly and the transmission torque fluctuates greatly, while in the one-way clutch bearing of the present invention shown in FIG. 9, the transmission torque is stable and the sprags or the rollers slide in a stable posture. Thus, in the one-way clutch bearing of the present invention, the sprags or the rollers slide stably and therefore, the sprags, the rollers, the inner race and the outer race are not destroyed or damaged and have a long life.

We claim:

1. A one-way clutch bearing having an outer race having an annular inner surface, an inner race having an annular outer surface corresponding to and concentric with said inner surface, and rolling members disposed in an annular space formed between said inner surface and said outer surface, said rolling members being displaceable within said space into engagement between said inner surface and said outer surface to prevent relative rotation of said inner and outer races in one direction and transmit a torque between said inner and outer races, characterized by holding means including a holding member for holding said rolling members at a displacement position at which said rolling members transmit a predetermined transmission torque, means for decreasing a wedge angle defined by a line extending from the center of said inner race to the point of contact between said rolling member and said inner race and a line passing through the points of contact between said rolling member and said inner and outer races before said rolling members arrive at said displacement position, and means for increasing the wedge angle after said wedge angle has been decreased by said means for decreasing the wedge angle.

2. A one-way clutch bearing according to claim 1, characterized in that said means for increasing the wedge angle comprises a flat surface.

3. A one-way clutch device comprising:
   inner and outer races defining an annular space therebetween;
   a plurality of sprags disposed in said annular space and tiltable into wedge engagement with said races in one rotational direction of the races to transmit a torque from one to the other of said races, and tiltable out of wedge engagement for slipping on the races in the other rotational direction of the races so as not to transmit a torque, each said sprag having inner and outer contact surfaces contacting said inner and outer races, respectively, during wedge engagement of the sprag with said inner and outer races, at least one of said inner and outer contact surface having a flat face at an end of a torque transmission side thereof, said flat face being brought into wedge-contact with the corresponding race when an input torque from said one of said races exceeds a predetermined value; and
   holding means including at least one holding member for holding said sprags such that said holding member contacts the front and rear sides of said sprags with respect to the rotational direction of said races when the input torque exceeds said predetermined value, with said sprags being held in positions such as to be slidable smoothly on the races while transmitting the torque of said predetermined value.

4. A one-way clutch device according to claim 3, wherein said holding means comprises two holding members which contact the front and the rear sides of said sprags with respect to the rotational direction of said races when the input torque exceeds said predetermined value and which hold said sprags in said positions.

* * * * *